(12) United States Patent
Kimura et al.

(10) Patent No.: US 11,495,832 B2
(45) Date of Patent: Nov. 8, 2022

(54) ELECTROCHEMICAL CELL

(71) Applicant: Seiko Instruments Inc., Chiba (JP)

(72) Inventors: Nagayuki Kimura, Chiba (JP); Shunji Watanabe, Chiba (JP); Yoshimi Kanno, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 391 days.

(21) Appl. No.: 16/667,245

(22) Filed: Oct. 29, 2019

(65) Prior Publication Data

US 2020/0153048 A1 May 14, 2020

(30) Foreign Application Priority Data

Nov. 14, 2018 (JP) .............................. JP2018-213800
Sep. 4, 2019 (JP) .............................. JP2019-161346

(51) Int. Cl.
*H01M 10/0587* (2010.01)
*H01M 10/0525* (2010.01)
*H01M 50/538* (2021.01)

(52) U.S. Cl.
CPC ... *H01M 10/0587* (2013.01); *H01M 10/0525* (2013.01); *H01M 50/538* (2021.01)

(58) Field of Classification Search
CPC .............................................. H01M 10/0587
See application file for complete search history.

(56) References Cited

U.S. PATENT DOCUMENTS 7,273,674 B1 * 9/2007 Frustaci ................ H01M 4/382
29/623.1
2003/0162088 A1 8/2003 Nakanishi et al.

FOREIGN PATENT DOCUMENTS

WO  WO 02/13305 A1  2/2002

* cited by examiner

*Primary Examiner* — Ula C Ruddock
*Assistant Examiner* — Thomas H. Parsons
(74) *Attorney, Agent, or Firm* — Crowell & Moring LLP

(57) ABSTRACT

A battery includes a negative electrode body wound to be flat. The negative electrode body has a plurality of negative electrode main bodies arranged in a line in a negative electrode connection direction in a developed state, and at least one negative electrode connection portion connecting a pair of negative electrode main bodies adjacent in the developed state among the plurality of negative electrode main bodies. The at least one negative electrode connection portion is folded back such that the plurality of negative electrode main bodies overlap each other. A dimension of each of the plurality of negative electrode main bodies in the negative electrode connection direction decreases with separation from an outer end side negative electrode main body. A dimension of the at least one negative electrode connection portions in the negative electrode connection direction increases with separation from an inner end side negative electrode connection portion.

19 Claims, 9 Drawing Sheets

ELECTROCHEMICAL CELL

RELATED APPLICATIONS

This application claims priority to Japanese Patent Application Nos. 2018-213800 filed on Nov. 14, 2018 and 2019-161346 filed on Sep. 4, 2019, the entire contents of which are incorporated herein by reference.

BACKGROUND OF THE INVENTION

1. Field of the Invention

The present invention relates to an electrochemical cell.

2. Description of the Related Art

In the related art, electrochemical cells such as lithium ion secondary batteries and electrochemical capacitors are widely used as power sources for small devices such as smartphones, wearable devices, and hearing aids.

In such electrochemical cells, from the viewpoint of increasing the battery capacity, the charging current, and the discharging current, it is necessary to increase the area of the electrodes opposing each other in the electrochemical cell. As the structure of the electrochemical cell, structures are known in which a pair of strip-shaped electrodes are opposed to each other via a strip-shaped separator and housed in a case and the electrodes and the separator are impregnated with an electrolytic solution. For example, a structure in which strip-shaped electrodes and a strip-shaped separator are wound and housed in a cylindrical or coin-like case and a structure deformed to have a flat shape and then housed in a laminate film are known.

In addition, PCT International Publication NO.WO 02/13305 discloses a battery in which a positive electrode plate and a negative electrode plate are each formed in a strip shape in which a plurality of laminated surfaces are connected by a connection piece, and the positive electrode plate and the negative electrode plate are folded back by the connection piece and wound in a flat shape to form an electrode plate group such that the laminated surface of the positive electrode plate and the laminated surface of the negative electrode plate are alternately laminated via separators. Furthermore, the above document discloses a configuration in which the connection pieces are formed such that, during winding, the lengths thereof in the connection direction increase sequentially from the connection piece positioned inside to the connection piece positioned outside.

SUMMARY OF THE INVENTION

However, in a case where the strip-shaped electrodes are wound and then deformed into a flat shape, the shape after deformation is a comparatively simple shape such as a rectangular parallelepiped shape. For this reason, depending on the shape of the exterior body, it is difficult to arrange the electrodes with a high density on the exterior body. In addition, in a case of folding and bending a connection piece to be wound into a flat shape, the connection piece is disposed so as to protrude from a laminated surface viewed from the laminating direction of the laminated surface. For this reason, the outer shape of the electrode is complicated and a gap is easily formed at the periphery of the electrodes in the exterior body. Thus, depending on the shape of the exterior body, it is difficult to arrange the electrodes with a high density on the exterior body. Accordingly, in the electrochemical cells of the related art, there is room for improvement in terms of achieving both improvement in the degree of freedom of the shape and securing the capacity.

Therefore, the present invention provides an electrochemical cell in which the degree of freedom in the shape is improved and the capacity is secured.

An electrochemical cell according to a first aspect of the present invention includes a negative electrode body wound to be flat, in which the negative electrode body has a plurality of negative electrode main bodies arranged in a line in a first direction in a developed state, and at least one negative electrode connection portion connecting a pair of negative electrode main bodies adjacent to each other in the developed state among the plurality of negative electrode main bodies, the at least one negative electrode connection portion is folded back such that the plurality of negative electrode main bodies overlap each other, among the plurality of negative electrode main bodies, the negative electrode main body disposed at an outermost periphery is defined as an outer end side negative electrode main body, among the plurality of negative electrode main bodies, the negative electrode main body disposed at an innermost periphery is defined as inner end side negative electrode main body, the at least one negative electrode connection portion is provided with an inner end side negative electrode connection portion, which is connected to the inner end side negative electrode main body, a dimension of each of the plurality of negative electrode main bodies in the first direction decreases with separation from the outer end side negative electrode main body, and a dimension of the at least one negative electrode connection portions in the first direction increases with separation from the inner end side negative electrode connection portion.

Here, focus is given to a pair of negative electrode main bodies adjacent to each other in the developed state. The intervals between the pairs of negative electrode main bodies in a wound state increase along with the increase in the number of layers of the negative electrode main bodies and the like disposed between the pair of negative electrode main bodies, as the pairs of negative electrode main bodies are pairs of negative electrode main bodies positioned further to the outer peripheral side. According to the electrochemical cell of the first aspect, the dimension of the negative electrode connection portion in the first direction increases with separation from the inner end side negative electrode connection portion such that it is possible to secure the interval between the pair of negative electrode main bodies and to limit positional deviation between the pair of negative electrode main bodies in the wound state. Thus, viewed from the direction in which the plurality of negative electrode main bodies overlap (referred to below as the laminating direction), the positional deviation of the plurality of negative electrode main bodies is limited.

Moreover, in the electrochemical cell according to the first aspect, the negative electrode main body positioned on the outer peripheral side among the pair of negative electrode main bodies is formed to be larger in the first direction than the negative electrode main body positioned on the inner peripheral side. For this reason, in a state where the plurality of negative electrode main bodies overlap each other, a non-overlapping region is provided in which the negative electrode main bodies positioned on the inner peripheral side do not overlap the negative electrode main bodies positioned on the outer peripheral side, viewed from the laminating direction. Arranging the negative electrode connection portion, which is connected to the negative electrode main body positioned on the inner peripheral side and extending in the laminating direction, in the non-overlapping region in the negative electrode main body positioned on the outer peripheral side viewed from the laminating direction makes it possible to limit the negative electrode connection portion from protruding from the negative electrode main body positioned on the outer peripheral side, viewed from the laminating direction.

As described above, viewed from the laminating direction, positional deviation of the plurality of negative electrode main bodies and protrusion of the negative electrode connection portion from the outer end side negative electrode main body is limited. Accordingly, it is possible to provide an electrochemical cell in which the negative electrode body is able be wound into a desired flat shape and for which the freedom of the shape is improved and the capacity is secured.

An electrochemical cell according to a second aspect of the present invention is the electrochemical cell according to the first aspect described above, further including a separator, and a positive electrode body overlapping the negative electrode body via the separator.

An electrochemical cell according to a third aspect of the present invention is the electrochemical cell according to the second aspect described above, in which a sum of a thickness of the negative electrode body, a thickness of the positive electrode body, and a thickness of two layers of the separators is defined as a total dimension, among the pair of negative electrode main bodies, a dimension in the first direction of a negative electrode main body positioned on an outer peripheral side is formed to be larger by the total dimension than a dimension in the first direction of a negative electrode main body positioned on an inner peripheral side.

In the electrochemical cell according to the third aspect, viewed from the laminating direction, in the non-overlapping region in the negative electrode main body positioned on the outer peripheral side described above, a negative electrode connection portion connected to the negative electrode main body positioned on the inner peripheral side, a positive electrode connection portion opposing the negative electrode connection portion, and a pair of separators opposing the positive electrode connection portion from both sides, are disposed. Thus, viewed from the laminating direction, the negative electrode connection portion and the positive electrode connection portion do not protrude from the negative electrode main body positioned on the outer peripheral side. Accordingly, viewed from the laminating direction, the negative electrode connection portion and the positive electrode connection portion are limited from protruding from the outer end side negative electrode main body, thus, it is possible for the negative electrode body and the positive electrode body to be more reliably wound in a desired flat shape.

An electrochemical cell according to a fourth aspect of the present invention is the electrochemical cell according to the second or third aspect, in which the at least one negative electrode connection portion includes a pair of negative electrode connection portions adjacent to each other in a developed state, a thickness of the negative electrode body, a thickness of the positive electrode body, and a thickness of two layers of the separators is defined as a total dimension, and among the pair of negative electrode connection portions, a dimension in the first direction of a negative electrode connection portion positioned on an outer peripheral side is formed to be larger by the total dimension than a dimension in the first direction of a negative electrode connection portion positioned on an inner peripheral side.

Here, focus is provided to a pair of negative electrode main bodies closest to the inner end side negative electrode main body in the developed state among the pair of negative electrode main bodies adjacent to each other in the developed state. Between the pair of negative electrode main bodies, an inner end side negative electrode main body, two layers of positive electrode bodies, and four separator layers opposing each other from both sides of the two layers of the positive electrode main bodies are disposed. According to the electrochemical cell according to the fourth aspect, the negative electrode connection portion is larger than the negative electrode connection portion adjacent to the inner peripheral side in the dimension of the sum of the thickness of the negative electrode body, the thickness of the positive electrode body, and the thickness of two layers of the separators. For this reason, the dimension of the negative electrode connection portion connected to the pair of negative electrode main bodies in the first direction is the sum of the thickness of the inner end side negative electrode main body, the thickness of two layers of the positive electrode bodies, and the thickness of four layers of the separators. Due to this, viewed from the laminating direction, the boundaries with the negative electrode connection portion in each of the pairs of negative electrode main bodies overlap each other. Thus, viewed from the laminating direction, the positional deviation of the pair of negative electrode main bodies is limited. Similarly, in the pairs of negative electrode main bodies, the negative electrode bodies, the positive electrode bodies, and the separators disposed between the pair of negative electrode main bodies increase as the pairs of negative electrode main bodies are positioned further to the outer peripheral side. Thus, by sequentially increasing the dimension of the negative electrode connection portion in the first direction, positional deviation viewed from the laminating direction is limited for every pair of negative electrode main bodies.

An electrochemical cell according to a fifth aspect of the present invention is the electrochemical cell according to the fourth aspect, in which a dimension in the first direction of the inner end side negative electrode connection portion is equal to a sum of the thickness of the positive electrode body and the thickness of two layers of the separators.

Here, focus is provided to the inner end side negative electrode main body and the negative electrode main body adjacent to the inner end side negative electrode main body in the developed state. Between the pair of negative electrode main bodies, the innermost peripheral portion of the positive electrode body and the pair of separators opposing the positive electrode body from both sides are disposed. According to the electrochemical cell according to the fifth aspect, since the dimension of the inner end side negative electrode connection portion in the first direction is the sum of the thickness of the positive electrode body and the thickness of two layers of the separators, the boundaries with the inner end side negative electrode connection portion in each of the pairs of negative electrode main bodies overlap each other viewed from the laminating direction. Due to this, viewed from the laminating direction, the positional deviation of the pair of negative electrode main bodies is limited.

As described above, the positional deviation of the plurality of negative electrode main bodies is limited and it is possible to wind the negative electrode body into a desired flat shape.

An electrochemical cell according to a sixth aspect of the present invention is the electrochemical cell according to the fourth aspect, wherein the positive electrode body includes a plurality of positive electrode main bodies arranged in a second direction in the developed state, the plurality of positive electrode main bodies arranged to alternately overlap the plurality of negative electrode main bodies, among the plurality of positive electrode main bodies, a positive electrode main body disposed at the innermost periphery is defined as an inner end side positive electrode main body, the inner end side negative electrode main body and the inner end side positive electrode main body are arranged with an interval larger than the thickness of one layer of the separator, and the dimension of the inner end side negative electrode connection portion in the first direction is equal to or greater than the sum of the thickness of the positive electrode body, the thickness of one layer of the separator, and the interval between the inner end side negative electrode main body and the inner end side positive electrode main body.

Here, focus is given to the inner end side negative electrode main body and the negative electrode main body adjacent to the inner end side negative electrode main body in the developed state. The inner end side positive electrode main body and the two layers of the separators opposed from both sides of the positive electrode body are disposed between a pair of negative electrode main bodies. One layer of the separator is disposed between the inner end side negative electrode main body and the inner end side positive electrode main body. For this reason, the interval of the pair of negative electrode main bodies is equal to the sum of the thickness of the positive electrode body, the thickness of one layer of the separator, and the interval between the inner end side negative electrode main body and the inner end side positive electrode main body. In the electrochemical cell according to the sixth aspect, since the interval between the inner end side negative electrode main body and the inner end side positive electrode main body is larger than the thickness of the one layer of the separator, a gap is formed between the inner end side negative electrode main body and the inner end side positive electrode main body.

With the electrochemical cell according to the sixth aspect, the dimension of the inner end side negative electrode connection portion in the first direction is equal to or greater than the sum of the thickness of the positive electrode body, the thickness of one layer of the separator, and the interval between the inner end side negative electrode main body and the inner end side positive electrode main body. For this reason, even when the gap is formed between the inner end side negative electrode main body and the inner end side positive electrode main body, a pair of negative electrode main bodies can be arranged such that they are in parallel to each other and the boundary with the inner end side negative electrode connection portion in each of a pair of negative electrode main bodies overlap each other when viewed from the laminating direction. In this way, the positional deviation of the pair of negative electrode main bodies is suppressed when viewed from the laminating direction.

Accordingly, it is possible to suppress the positional deviation of the plurality of negative electrode main bodies and to wind the negative electrode bodies into a desired flat shape.

An electrochemical cell according to a seventh aspect of the present invention is the electrochemical cell according to any one of the second to sixth aspects, in which the plurality of negative electrode main bodies are formed in a shape having a major axis extending in a direction orthogonal to the first direction in the developed state, the positive electrode body has a plurality of positive electrode main bodies arranged in a line in a second direction in the developed state and formed in a shape having a major axis extending in a direction orthogonal to the second direction, and at least one positive electrode connection portion connecting a pair of positive electrode main bodies adjacent to each other in the developed state among the plurality of positive electrode main bodies, the at least one positive electrode connection portion is folded back such that the plurality of positive electrode main bodies respectively overlap the plurality of negative electrode main body, and in a case where N is a natural number, among the plurality of positive electrode main bodies, a positive electrode main body positioned Nth from a positive electrode main body disposed at the innermost periphery toward an outer peripheral side is defined as an Nth positive electrode main body, and among the plurality of negative electrode main bodies, a negative electrode main body positioned Nth from the inner end side negative electrode main body toward an outer peripheral side is defined as an Nth negative electrode main body, a positive electrode connection portion connecting the Nth positive electrode main body and an (N+1)th positive electrode main body among the at least one positive electrode connection portion is formed such that a distance between major axes of the Nth positive electrode main body and an (N+1)th positive electrode main body matches a distance between major axes of the Nth negative electrode main body and an (N+1)th negative electrode main body.

According to the electrochemical cell according to the seventh aspect, it is possible to wind the plurality of positive electrode main bodies from the innermost periphery toward the outer periphery to be disposed at the same pitch as the plurality of negative electrode main bodies. For this reason, viewed from the laminating direction, it is possible to overlap the major axes of the plurality of positive electrode main bodies with the major axis of the negative electrode main bodies. As described above, since the plurality of negative electrode main bodies are disposed in a state in which positional deviation is limited, the positional deviation of the plurality of positive electrode main bodies is also limited. Moreover, since the positive electrode body is disposed without slack between the layers of the negative electrode bodies, it is possible to limit the protrusion of the positive electrode connection portion as viewed from the laminating direction. Accordingly, it is possible to wind the negative electrode bodies and the positive electrode bodies into a desired flat shape.

An electrochemical cell according to a eighth aspect of the present invention is the electrochemical cell according to the seventh aspect, in which an outer shape of each of the plurality of positive electrode main bodies is smaller than an outer shape of a negative electrode main body included in the plurality of negative electrode main bodies which is opposed to each of the plurality of positive electrode main bodies via the separator.

In the lithium ion battery, when the edge of the negative electrode body is present at the portion opposed to the positive electrode main body, there is a possibility that lithium ions moved from the positive electrode body at the time of charging of the electrochemical cell may be concentrated at the edge of the negative electrode body by the edge effect to cause needle-like precipitation. As described above, when lithium ions are precipitated as lithium metal, there is a possibility that the lithium ions may pierce the separator and cause a short circuit between the negative electrode body and the positive electrode body. According to the electrochemical cell of the eighth aspect, it is possible to avoid having the edge of the negative electrode body present in the portion opposed to the positive electrode main body.

Accordingly, it is possible to limit a short circuit between the negative electrode body and the positive electrode body and to improve the reliability of the electrochemical cell.

An electrochemical cell according to a ninth aspect of the present invention is the electrochemical cell according to the eighth aspect, in which the positive electrode body includes a lithium compound as a positive electrode active material.

According to the electrochemical cell according to the ninth aspect, by avoiding having the edge of the negative electrode body present in the portion opposed to the positive electrode main body, it is possible for lithium ions to be absorbed in the negative electrode active material of the negative electrode body. Thus, it is possible to limit the precipitation of needle-like lithium from the negative electrode body. Accordingly, it is possible to limit a short circuit between the negative electrode body and the positive electrode body and to improve the reliability of the electrochemical cell.

DETAILED DESCRIPTION OF THE PREFERRED EMBODIMENTS

Figure 1:
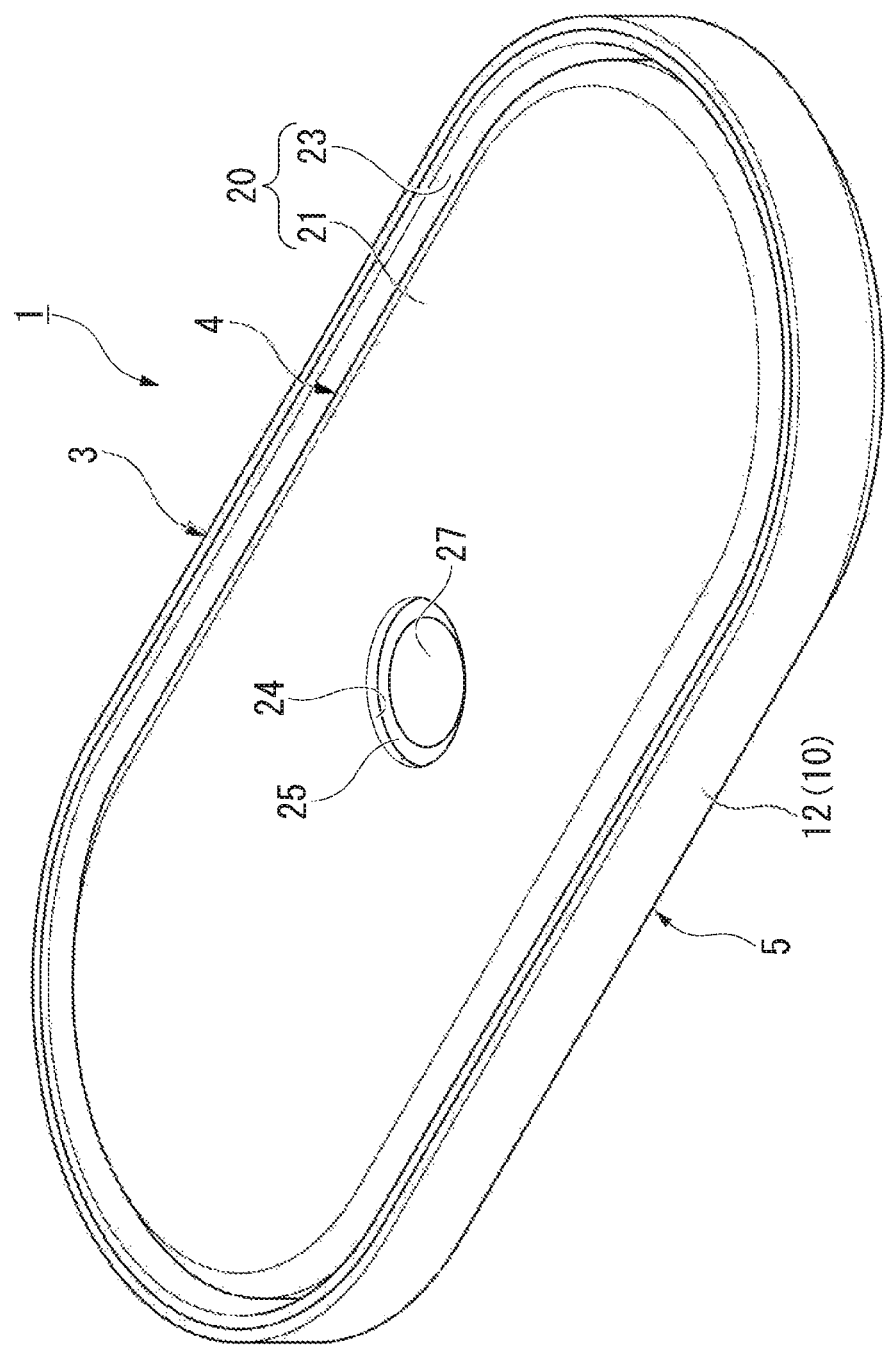
FIG. 1 is a perspective view of a battery of an embodiment.

A description will be provided below of embodiments of the present invention based on the drawings. In the following description, components having the same or similar functions are denoted by the same reference numerals. Duplicate explanation of these components may be omitted. In addition, in the following description, a description will be provided of a lithium ion secondary battery (may be simply referred to as a "battery"), which is a type of non-aqueous electrolyte secondary battery, as an example of an electrochemical cell.

First Embodiment

Figure 2:
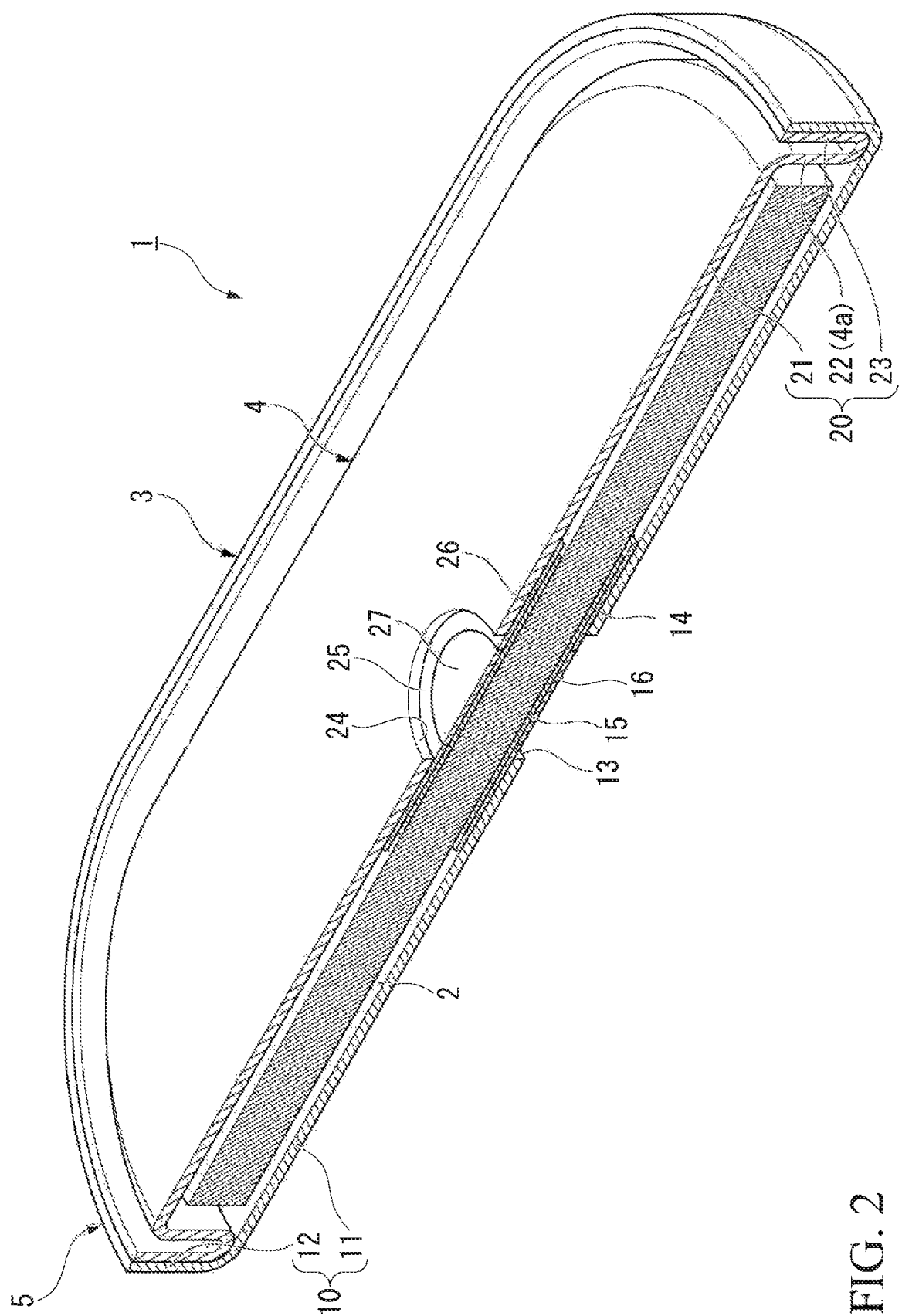
FIG. 2 is a cross-sectional view of the battery of the embodiment.

FIG. 1 is a perspective view of the battery of the embodiment. FIG. 2 is a cross-sectional view of the battery of the embodiment.

As shown in FIG. 1 and FIG. 2, a battery 1 is a battery having an oval shape in a plan view (a rounded rectangular shape). The battery 1 is provided with a laminated electrode body 2, an electrolyte solution (not shown) impregnated in the laminated electrode body 2, and an exterior body 3 in which the laminated electrode body 2 is housed.

The exterior body 3 is provided with a housing portion 4 in which the laminated electrode body 2 is housed, and a sealing portion 5 bent along an outer periphery 4a of the housing portion 4. The sealing portion 5 is bent along the outer periphery 4a of the housing portion 4 by drawing, for example.

In addition, the exterior body 3 is provided with a first container 10 and a second container 20 with the laminated electrode body 2 sandwiched therebetween. The first container 10 and the second container 20 are each formed of a laminate film. The laminate film has a metal layer (metal foil), a resin-made fusion layer provided on the overlapping surface (inner side surface) and covering the metal layer, and a protection layer made of resin provided on the outer side surface and covering the metal layer. The metal layer is formed using, for example, a metal material, which blocks outside air or water vapor, such as stainless steel or aluminum. The fusion layer on the overlapping surface is formed using, for example, a thermoplastic resin such as polyolefin polyethylene or polypropylene. The protective layer on the outer side surface is formed of, for example, the polyolefin described above, a polyester such as polyethylene terephthalate, nylon, or the like.

The first container 10 is provided with an oval-shaped first bottom wall portion 11 and a first peripheral wall portion 12 extending in a cylindrical shape from the outer periphery of the first bottom wall portion 11. A first through hole 13 is formed in the first bottom wall portion 11. The first through hole 13 is formed at the center of the first bottom wall portion 11.

A copper plate 15 is heat-sealed to the inner surface of the first bottom wall portion 11 via a first sealant ring 14. The first sealant ring 14 is formed by forming a sealant film in a ring shape. The sealant film is formed using a thermoplastic resin such as polyolefin polyethylene or polypropylene.

The inner surface of the copper plate 15 is connected to a negative electrode body 30 (refer to FIG. 3) of the laminated electrode body 2 described below. A nickel plate 16 is welded to the center of the outer surface of the copper plate 15. The nickel plate 16 is exposed to the outside through the first through hole 13 and functions as a negative electrode terminal of the battery 1. In addition, when a nickel plate is used instead of the copper plate 15, the nickel plate 16 may be omitted.

The second container 20 is provided with an oval-shaped second bottom wall portion 21, a second peripheral wall portion 22 extending in a cylindrical shape from the outer periphery of the second bottom wall portion 21, and a bent portion 23 bent from the opening edge of the second peripheral wall portion 22 to the outside of the second peripheral wall portion 22 and extending to the second bottom wall portion 21 side.

The second bottom wall portion 21 is disposed on the opposite side of the first bottom wall portion 11 of the first container 10 with the laminated electrode body 2 interposed therebetween. The second bottom wall portion 21 is formed to be slightly smaller than the first bottom wall portion 11 of the first container 10. A second through hole 24 is formed in the second bottom wall portion 21. The second through hole 24 is formed in the center of the second bottom wall portion 21.

An aluminum plate 26 is heat sealed to the inner surface of the second bottom wall portion 21 via a second sealant ring 25. In the same manner as the first sealant ring 14, the second sealant ring 25 is formed of a thermoplastic resin.

The inner surface of the aluminum plate 26 is connected to a positive electrode body 40 (refer to FIG. 3) of the laminated electrode body 2 described below. A nickel plate 27 is welded to the center of the outer surface of the aluminum plate 26. The nickel plate 27 is exposed to the outside through the second through hole 24 and functions as a positive electrode terminal of the battery 1. For example, it is also possible to use a plate material made of stainless steel instead of the aluminum plate 26.

The second peripheral wall portion 22 extends from the outer periphery of the second bottom wall portion 21 toward the first bottom wall portion 11 of the first container 10. The second peripheral wall portion 22 forms the outer periphery 4a of the housing portion 4. The bent portion 23 is cylindrically bent from the end portion on the first bottom wall portion 11 side of the second peripheral wall portion 22 along the second peripheral wall portion 22 toward the second bottom wall portion 21. The bent portion 23 is disposed with an interval on the outside of the second peripheral wall portion 22.

The second peripheral wall portion 22 is disposed inside the first peripheral wall portion 12 and inside the bent portion 23. In addition, the bent portion 23 is disposed inside the first peripheral wall portion 12. The fusion layer of the bent portion 23 is heat sealed to the fusion layer of the first peripheral wall portion 12.

The sealed layer of the bent portion 23 and the sealed layer of the first peripheral wall portion 12 are heat sealed to form the sealing portion 5. Thus, the outer periphery of the housing portion 4 is sealed by the sealing portion 5. Due to this, the first container 10 and the second container 20 are overlapped to form the exterior body 3. The sealing portion 5 is formed in a cylindrical shape on the outside of the housing portion 4 and is bent along the outer periphery 4a of the housing portion 4.

A sealed space is formed in the housing portion 4 by overlapping the first container 10 and the second container 20. Specifically, the housing portion 4 is partitioned by the first bottom wall portion 11, the second bottom wall portion 21, and the second peripheral wall portion 22, and is formed in an oval shape in a plan view.

Figure 3:
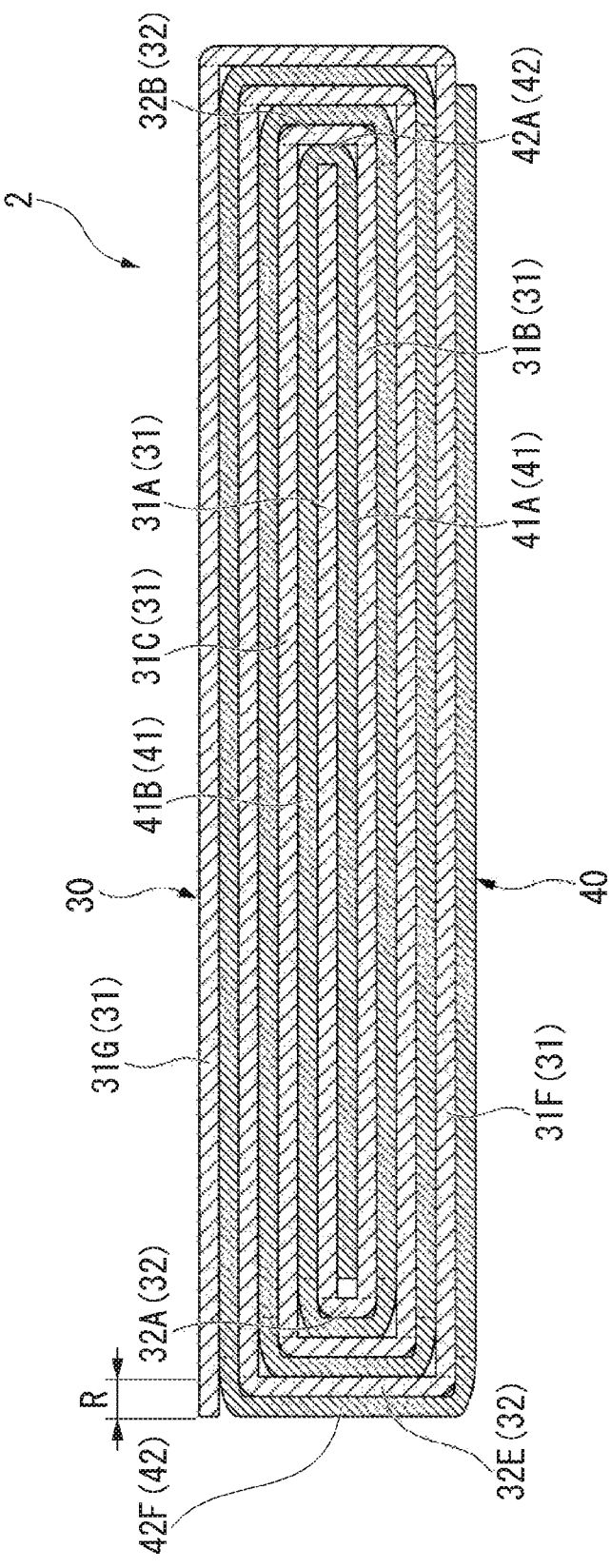
FIG. 3 is a cross-sectional view of a laminated electrode body of the embodiment.
Figure 4:
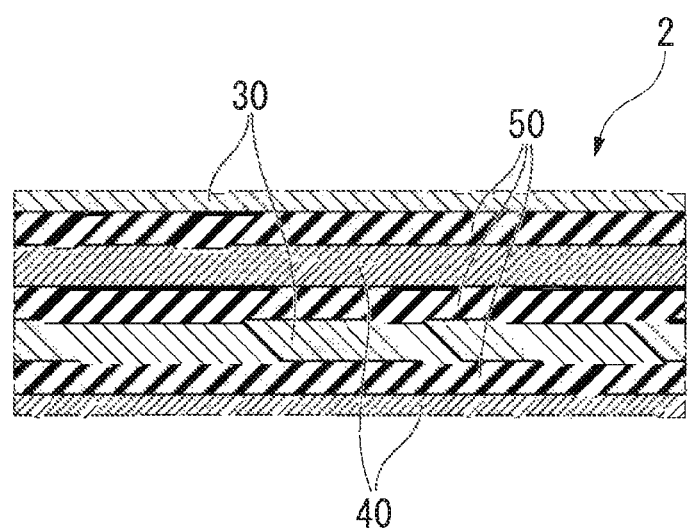
FIG. 4 is a cross-sectional view showing a part of the laminated electrode body of the embodiment in an enlarged manner.

FIG. 3 is a cross-sectional view of the laminated electrode body of the embodiment. FIG. 4 is a cross-sectional view showing a part of the laminated electrode body of the embodiment in an enlarged manner.

As shown in FIG. 3 and FIG. 4, the laminated electrode body 2 is provided with the sheet-like negative electrode body 30, the positive electrode body 40, and a separator 50. The laminated electrode body 2 is a laminated type electrode body folded back so as to alternately laminate the negative electrode body 30 and the positive electrode body 40. Specifically, the laminated electrode body 2 is formed by overlapping and winding the negative electrode body 30 and the positive electrode body 40 via the separator 50 to be flat. The outermost peripheral portion of the negative electrode body 30 is connected directly to the copper plate 15 described above or through a lead tab or the like. The outermost peripheral portion of the positive electrode body 40 is connected directly to the aluminum plate 26 described above or through a lead tab or the like.

The separators 50 are disposed between the layers of the negative electrode body 30 and the positive electrode body 40 and insulate the negative electrode body 30 and the positive electrode body 40. For example, the separators 50 are wound together with the negative electrode body 30 and the positive electrode body 40 in a state in which the separators 50 are disposed so as to sandwich the positive electrode body 40 from both sides in the thickness direction of the positive electrode body 40. Although illustration of the separator 50 is omitted in FIG. 3, the separator 50 is disposed to be sandwiched between the negative electrode body 30 and the positive electrode body 40 in the entire region where at least the negative electrode body 30 and the positive electrode body 40 oppose each other. Below, the direction in which the negative electrode body 30 and the positive electrode body 40 are alternately laminated is referred to as a laminating direction. In addition, the winding means winding around the periphery of a specific position in one direction.

The negative electrode body 30 is a single sheet-like member provided with a negative electrode current collector foil formed of a metal material and a negative electrode active material coated on the negative electrode current collector foil. The negative electrode current collector foil is formed of, for example, a metal foil such as copper or stainless steel. The negative electrode active material is, for example, silicon oxide, graphite, hard carbon, lithium titanate, LiAl, or the like.

The positive electrode body 40 is a single sheet-like member provided with a positive electrode current collector foil formed of a metal material and a positive electrode active material coated on the positive electrode current collector foil. The positive electrode current collector foil is formed of, for example, a metal foil such as aluminum or stainless steel. The positive electrode active material is, for example, a composite oxide including lithium and a transition metal such as lithium cobaltate, lithium titanate, and lithium manganate.

The separator 50 is a member having the property of transmitting lithium ions. The separator 50 is formed of, for example, a resin porous film made of polyolefin, a nonwoven fabric made of glass, a nonwoven fabric made of resin, a laminate of cellulose fibers, or the like.

Figure 5:
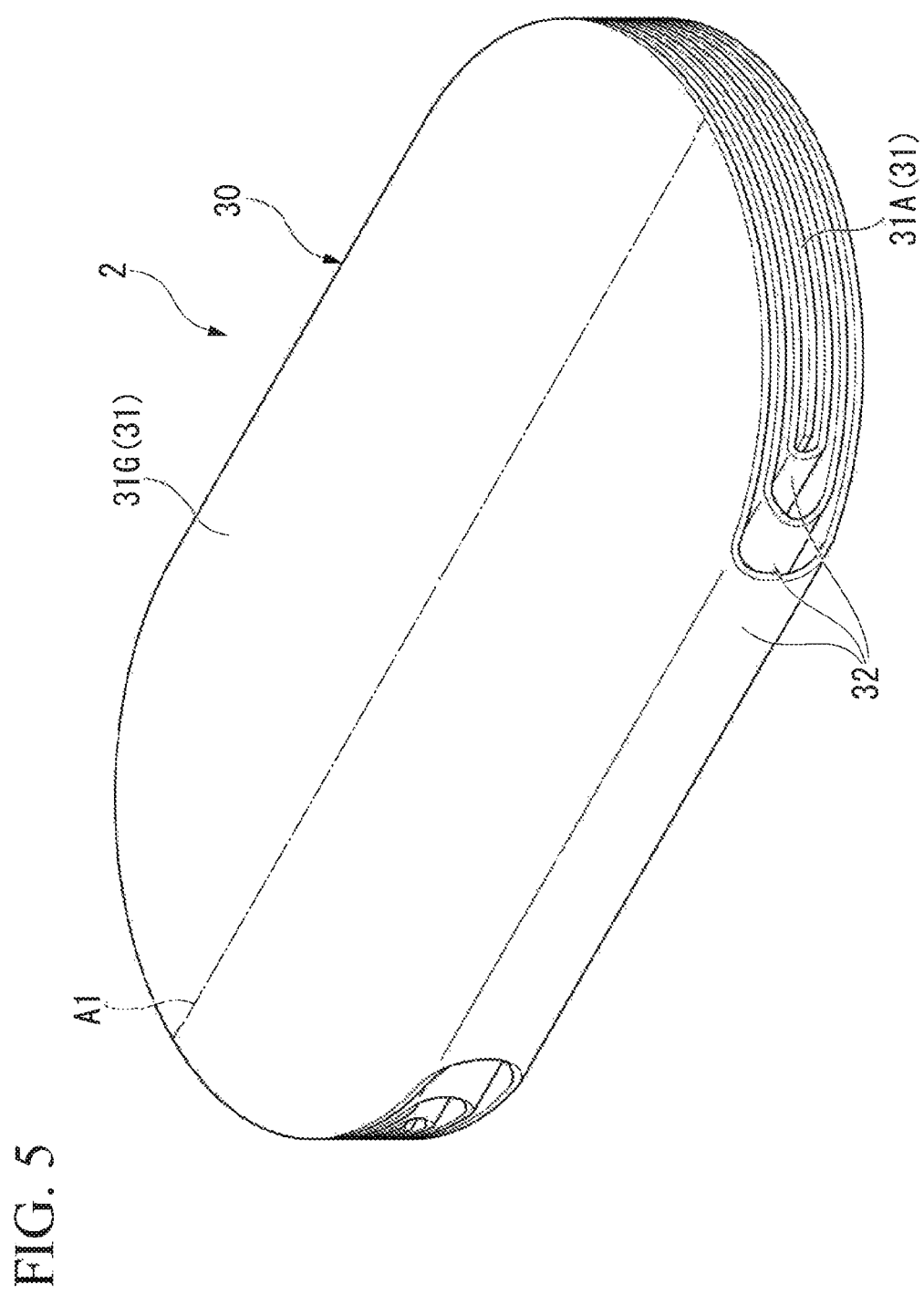
FIG. 5 is a perspective view showing the laminated electrode body of the embodiment.

FIG. 5 is a perspective view showing the laminated electrode body of the embodiment. In addition, illustration of the separator 50 is omitted in FIG. 5. In addition, the positive electrode body 40 is formed to be smaller than the negative electrode body 30 as described below, thus, by being disposed between the layers of negative electrode body 30, the positive electrode body 40 is not exposed on the surface of laminated electrode body 2 in the view of FIG. 5.

As shown in FIG. 5, the laminated electrode body 2 is formed in a shape corresponding to the shape of the sealed space in the housing portion 4 so as to be disposed at high density in the housing portion 4 of the exterior body 3 (refer to FIG. 2). That is, the laminated electrode body 2 is formed in an oval shape (a rounded rectangular shape) viewed from the laminating direction. In addition, the shape of the laminated electrode body 2 viewed from the laminating direction is defined as the basic shape.

Figure 6:
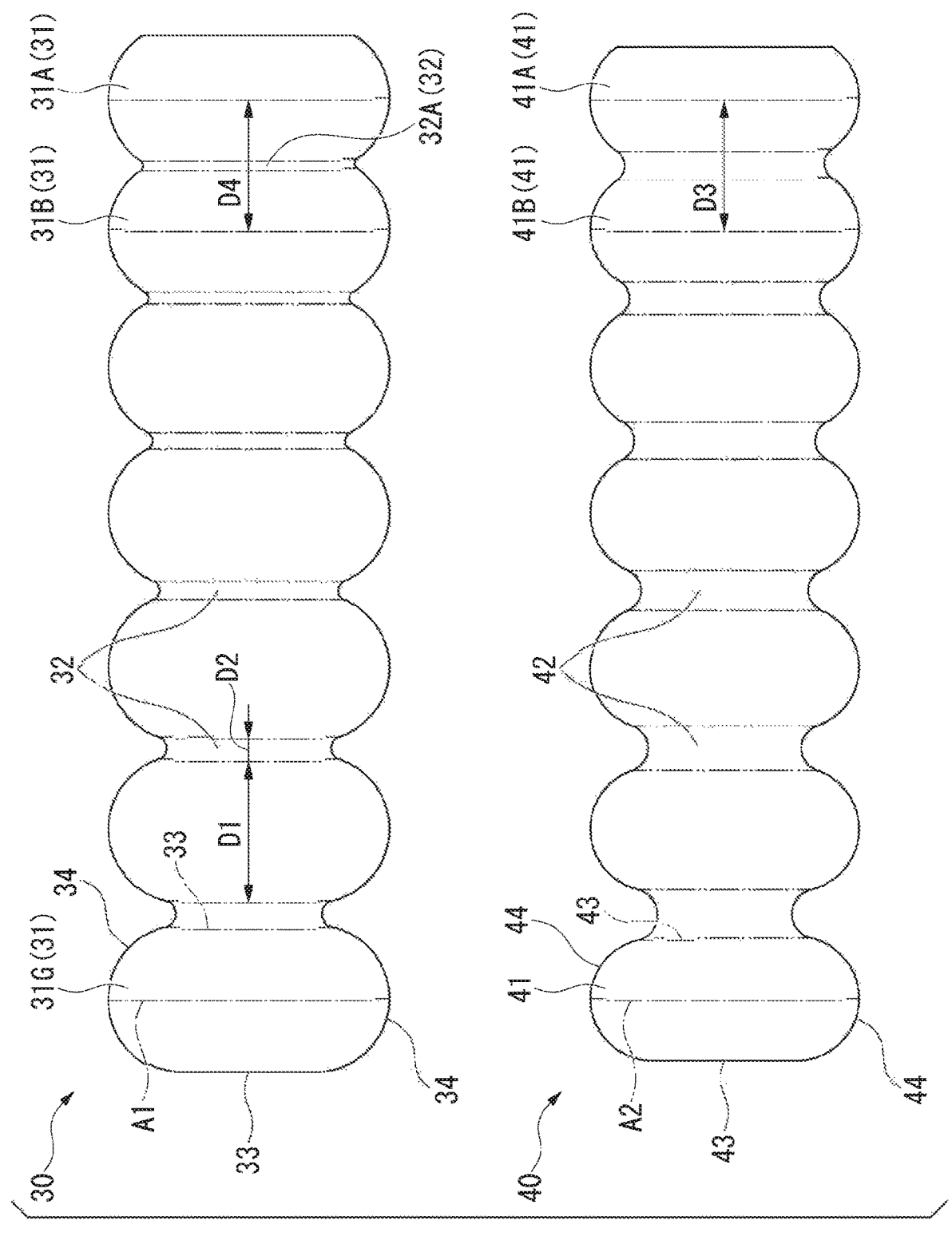
FIG. 6 is a plan view showing a negative electrode body and a positive electrode body of the embodiment.

Here, a description will be provided of the shape of the negative electrode body 30 in the state where the laminated electrode body 2 is developed. FIG. 6 is a plan view showing the negative electrode body and the positive electrode body of the embodiment.

As shown in FIG. 6, the negative electrode body 30 has a plurality (seven in the shown example) of negative electrode main bodies 31 arranged in a line, and at least one (six in the shown example) negative electrode connection portion 32 connected to a pair of adjacent negative electrode main bodies 31. The negative electrode main bodies 31 are portions extending to be flat along the vertical surface in the laminating direction in the laminated electrode body 2 (refer to FIG. 3 and FIG. 5). The negative electrode connection portion 32 is a portion where the plurality of negative electrode main bodies 31 are folded back at the side portion of the laminated electrode body 2 so as to overlap each other (refer to FIG. 3 and FIG. 5).

Below, the direction in which the plurality of negative electrode main bodies 31 are lined up is referred to as the negative electrode connection direction (first direction), and the direction orthogonal to the negative electrode connection direction is referred to as the negative electrode width direction. In addition, in the negative electrode connection direction, with respect to the negative electrode main body 31 disposed closest to the winding center side of the laminated electrode body 2 among the plurality of negative electrode main bodies 31, the side of the negative electrode main body 31 disposed on the outer peripheral side of the laminated electrode body 2 is defined as the "outer peripheral side" and the opposite direction is defined as the "inner peripheral side". In addition, a description will be provided below of the plurality of negative electrode main bodies 31 with ordinal numbers attached sequentially from the negative electrode main body 31 of the innermost periphery to the outer peripheral side. In other words, N is a natural number, and the Nth negative electrode main body counted from the negative electrode main body 31 at the innermost periphery to the outer peripheral side is referred to as an Nth negative electrode main body. For example, the negative electrode main body 31 at the innermost periphery is the first negative electrode main body. The same also applies to the plurality of negative electrode connection portions 32. The first negative electrode main body is an example of an "inner end side negative electrode main body". The seventh negative electrode main body is an example of the "outer end side negative electrode main body". The first negative electrode connection portion is an example of the "inner end side negative electrode connection portion".

The plurality of negative electrode main bodies 31 are disposed such that the centers in the negative electrode width direction overlap each other when viewed from the negative electrode connection direction. The plurality of negative electrode main bodies 31 are formed in a shape in which a part of the basic shape is missing. That is, the plurality of negative electrode main bodies 31 are formed in a shape in which a part of the oval shape having a major axis A1 is missing. The plurality of negative electrode main bodies 31 are disposed such that the major axis A1 extends in the negative electrode width direction. The outer shape of each negative electrode main body 31 is formed by a pair of linear portions 33 linearly extending in the negative electrode width direction, and a pair of arc-shaped curved portions 34 connecting the end portions of the pair of the linear portions 33 to each other. The curved portions 34 extend in a direction intersecting the negative electrode width direction and form a part of a portion of the outer edge of the negative electrode body 30 facing in the negative electrode width direction. The entirety of the linear portions 33 is provided close to the major axis A1 in the negative electrode connection direction with respect to the basic shape such that the dimensions of the negative electrode main body 31 in the negative electrode connection direction are smaller with respect to the basic shape. The seventh negative electrode main body 31G disposed at the outermost periphery is formed such that the entire linear portion 33 positioned on the inner peripheral side is closer to the major axis A1 than the basic shape. In the negative electrode main body 31 positioned further to the inner peripheral side than the seventh negative electrode main body 31G, both the linear portion 33 positioned on the inner peripheral side and the linear portion 33 positioned on the outer peripheral side are all formed to be closer to the side of the major axis A1 than the basic shape.

A dimension D1 of each of the plurality of negative electrode main bodies 31 in the negative electrode connection direction is smaller with separation from the seventh negative electrode main body 31G. Specifically, the negative electrode main body 31 positioned on the outer peripheral side among the adjacent pair of negative electrode main bodies 31 is formed to be larger in the negative electrode connection direction than the negative electrode main body 31 positioned on the inner peripheral side in the dimension of the sum of the thickness of the negative electrode body 30, the thickness of the positive electrode body 40, and the thickness of the two layers of the separators 50.

The plurality of negative electrode connection portions 32 are provided between a pair of negative electrode main bodies 31 adjacent in the negative electrode connection direction. Each negative electrode connection portion 32 is formed such that the center portion in the negative electrode connection direction is the narrowest. The center portion is intended to include not only the center between both ends of the object but also the inner range between both ends of the object. The outer edges on both sides of the negative electrode connection portion 32 in the negative electrode width direction extend in an arc shape recessed in the negative electrode width direction. The outer edges on both sides of the negative electrode connection portion 32 in the negative electrode width direction are continuously connected to the curved portion 34 of the negative electrode main body 31. Specifically, the outer edges on both sides of the negative electrode connection portion 32 in the negative electrode width direction are connected to the curved portion 34 of the negative electrode main body 31 via inflection points. In other words, a straight line extending in the negative electrode width direction through the inflection point at the outer edge of the negative electrode body 30 in the negative electrode width direction is the boundary between the negative electrode main body 31 and the negative electrode connection portion 32.

A dimension D2 of the plurality of negative electrode connection portions 32 in the negative electrode connection direction is larger with separation from the first negative electrode connection portion 32A disposed on the innermost periphery. Specifically, the dimension D2 of each negative electrode connection portion 32 in the negative electrode connection direction is as follows. Each negative electrode connection portion 32 is formed to be larger than the negative electrode connection portion 32 adjacent to the inner peripheral side in the dimension of the sum of the thickness of the negative electrode body 30, the thickness of the positive electrode body 40, and the thickness of the two layers of the separators 50. The dimension of the first negative electrode connection portion 32A in the negative electrode connection direction is equal to the sum of the thickness of the positive electrode body 40 and the thickness of two layers of the separators 50.

Next, a description will be provided of the shape of the positive electrode body 40 in the state where the laminated electrode body 2 is developed.

The positive electrode body 40 has a plurality (seven in the shown example) of positive electrode main bodies 41 arranged in a line and at least one (six in the shown example) positive electrode connection portion 42 connecting the adjacent pair of positive electrode main bodies 41. The positive electrode main body 41 is a portion extending to be flat along the vertical surface in the laminating direction in the laminated electrode body 2 (refer to FIG. 3). The positive electrode connection portion 42 is a portion folded back at the side portion of the laminated electrode body 2 such that the plurality of positive electrode main bodies 41 alternately overlap the negative electrode main body 31 (refer to FIG. 3).

Hereinafter, the direction in which the plurality of positive electrode main bodies 41 are lined up is referred to as a positive electrode connection direction (second direction), and the direction orthogonal to the positive electrode connection direction is referred to as a positive electrode width direction. In addition, the side of the positive electrode main body 41 disposed on the outer peripheral side of the laminated electrode body 2 is defined as the "outer peripheral side" with respect to the positive electrode main body 41 disposed closest to the winding center side of the laminated electrode body 2 among the plurality of positive electrode main bodies 41 in the positive electrode connection direction, and the opposite direction is defined as "inner peripheral side". In addition, a description will be provided below of the plurality of positive electrode main bodies 41 and the plurality of positive electrode connection portions 42 by attaching ordinal numbers thereto similarly to the negative electrode main body 31 and the negative electrode connection portion 32.

The plurality of positive electrode main bodies 41 are provided in the same number as the negative electrode main bodies 31. The plurality of positive electrode main bodies 41 are disposed such that the centers in the positive electrode width direction overlap each other viewed from the positive electrode connection direction. The outer shape of each positive electrode main body 41 is formed by a pair of linear portions 43 extending in the positive electrode width direction and a pair of arc-shaped curved portions 44 connecting the end portions of the pair of linear portions 43 to each other. The curved portion 44 extends in a direction intersecting the positive electrode width direction and forms a part of a portion of the outer edge of the positive electrode body 40 facing the positive electrode width direction. The plurality of positive electrode main bodies 41 are formed in a shape in which linear portions 43 are provided close to a major axis A2 with respect to an oval shape having the major axis A2 extending in the positive electrode width direction. The plurality of positive electrode main bodies 41 are formed to be smaller than the outer shape of the opposing negative electrode main body 31 through the separator 50 in the laminated electrode body 2. Specifically, the dimension of the first positive electrode main body 41A in the positive electrode connection direction is formed to be smaller than the dimension of the first negative electrode main body 31A in the negative electrode connection direction, in a predetermined dimension. In addition, the dimension of the first positive electrode main body 41A in the positive electrode width direction is formed to be smaller than the dimension of the first negative electrode main body 31A in the negative electrode width direction, in a predetermined dimension. The same also applies to the other positive electrode main bodies 41.

The plurality of positive electrode connection portions 42 are provided between a pair of the positive electrode main bodies 41 adjacent in the positive electrode connection direction. Each of the positive electrode connection portions 42 is formed such that the center portion in the positive electrode connection direction is the narrowest. The outer edges on both sides of the positive electrode connection portion 42 in the positive electrode width direction extend in an arc shape recessed in the positive electrode width direction. The outer edges on both sides of the positive electrode connection portion 42 in the positive electrode width direction are continuously connected to the curved portion 44 of the positive electrode main body 41. Specifically, the outer edges on both sides of the positive electrode connection portion 42 in the positive electrode width direction are connected to the curved portion 44 of the positive electrode main body 41 via inflection points. In other words, a straight line extending in the positive electrode width direction through the inflection point at the outer edge of the positive electrode body 40 in the positive electrode width direction is the boundary between the positive electrode main body 41 and the positive electrode connection portion 42.

The dimension of the positive electrode connection portion 42 in the positive electrode connection direction is set based on the following conditions. The Nth positive electrode connection portion 42 is formed such that a distance D3 between the major axes A2 of the Nth positive electrode main body 41 and the (N+1)th positive electrode main body 41 adjacent to the Nth positive electrode connection portion 42 matches a distance D4 between the major axes A1 of the Nth negative electrode main body 31 and the (N+1)th negative electrode main body 31. For example, the distance between the major axis A2 of the first positive electrode main body 41A and the major axis A2 of the second positive electrode main body 41B matches the distance between the major axis A1 of the first negative electrode main body 31A and the major axis A1 of the second negative electrode main body 31B.

Figure 7:
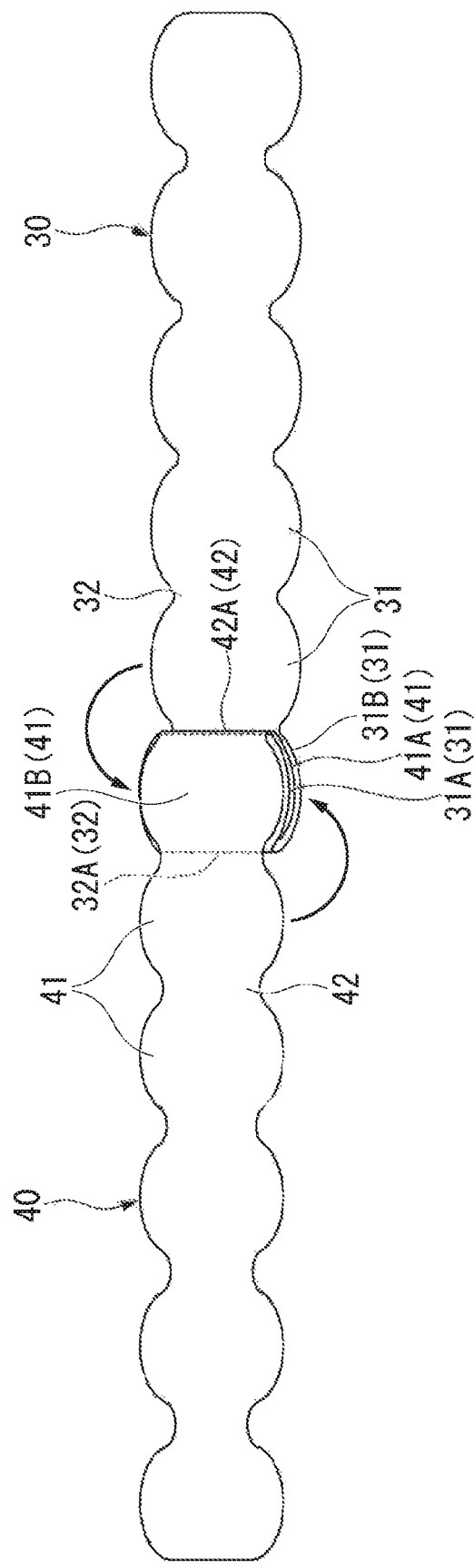
FIG. 7 is a view showing a winding method of the negative electrode body and the positive electrode body of the embodiment.

Next, a description will be provided of the winding structure of the negative electrode body 30 and the positive electrode body 40. FIG. 7 is a view showing a winding method of the negative electrode body and the positive electrode body of the embodiment.

As shown in FIG. 7, first, the first negative electrode main body 31A of the negative electrode body 30 and the first positive electrode main body 41A of the positive electrode body 40 overlap each other. At this time, in the first negative electrode main body 31A and the first positive electrode main body 41A, each of the major axes A1 and A2 (refer to FIG. 6) overlap each other, and the central point of the major axis A1 and the central point of the major axis A2 are disposed to overlap. In addition, the negative electrode body 30 and the positive electrode body 40 are disposed so as to extend in opposite directions to each other from the first negative electrode main body 31A and the first positive electrode main body 41A. Below, a portion where the first negative electrode main body 31A and the first positive electrode main body 41A are overlapped is referred to as a reference overlapping portion.

Subsequently, the negative electrode body 30 and the positive electrode body 40 are wound around the reference overlapping portion such that the reference overlapping portion is the winding center. Specifically, the negative electrode body 30 and the positive electrode body 40 are wound by the following procedure. The first negative electrode connection portion 32A of the negative electrode body 30 is folded back and the second negative electrode main body 31B overlaps the first positive electrode main body 41A on the opposite side to the first negative electrode main body 31A. At this time, the first negative electrode main body 31A and the second negative electrode main body 31B are disposed such that the major axes A1 may overlap each other, viewed from the laminating direction. In addition, a first positive electrode connection portion 42A of the positive electrode body 40 is folded back and the second positive electrode main body 41B overlaps the first negative electrode main body 31A on the opposite side to the first positive electrode main body 41A. At this time, the first positive electrode main body 41A and the second positive electrode main body 41B are disposed such that the major axes A2 overlap each other, viewed from the laminating direction. Thereafter, each of the negative electrode connection portions 32 is folded back such that each of the negative electrode main bodies 31 overlap each other, and each of the positive electrode connection portions 42 are folded back such that each of the positive electrode main bodies 41 overlap each other. Due to this, the laminated electrode body 2 is formed.

Next, a description will be provided of the operation of the present embodiment with reference to FIG. 3. Here, focus is given to the first negative electrode main body 31A and the second negative electrode main body 31B adjacent to each other in the developed state. Between the first negative electrode main body 31A and the second negative electrode main body 31B, the first positive electrode main body 41A and a pair of the separators 50 (refer to FIG. 4) provided to sandwich the first positive electrode main body 41A are disposed. As described above, since the dimension of the first negative electrode connection portion 32A in the negative electrode connection direction is the sum of the thickness of the positive electrode body 40 and the thickness of two layers of the separators 50, the boundaries between the first negative electrode connection portion 32A and each of the first negative electrode main body 31A and the second negative electrode main body 31B overlap each other viewed from the laminating direction. Due to this, viewed from the laminating direction, positional deviation between the first negative electrode main body 31A and the second negative electrode main body 31B is limited.

Subsequently, focus is given to the second negative electrode main body 31B and the third negative electrode main body 31C adjacent to each other in the developed state. Between the second negative electrode main body 31B and the third negative electrode main body 31C, a first negative electrode main body 31A, two layers of a first positive electrode main body 41A and a second positive electrode main body 41B, and four layers of the separators 50 opposed from both sides of each of a first positive electrode main body 41A and a second positive electrode main body 41B are disposed. As described above, the second negative electrode connection portion 32B is larger than the first negative electrode connection portion 32A in the dimension of the sum of the thickness of the negative electrode body 30, the thickness of the positive electrode body 40, and the thickness of two layers of the separators 50. Therefore, the dimension of the second negative electrode connection portion 32B in the negative electrode connection direction is the sum of the thickness of the negative electrode body 30, the thickness of two layers of the positive electrode body 40, and the thickness of four layers of the separators 50. Due to this, the boundaries between the second negative electrode connection portion 32B and each of the second negative electrode main body 31B and the third negative electrode main bodies 31C overlap each other viewed from the laminating direction. Thus, viewed from the laminating direction, positional deviation between the second negative electrode main body 31B and the third negative electrode main body 31C is limited.

Similarly, in the pairs of negative electrode main bodies 31 adjacent to each other in the developed state, the negative electrode body 30, the positive electrode body 40, and the separator 50 disposed between the pair of negative electrode main bodies 31 increase as the pair of the negative electrode main bodies 31 are positioned further to the outer peripheral side. Thus, by sequentially increasing the dimension of the negative electrode connection portion 32 in the negative electrode connection direction, positional deviation viewed from the laminating direction is limited for any pair of negative electrode main bodies 31 adjacent to each other in the developed state.

As described above, positional deviation of the plurality of negative electrode main bodies 31 is limited.

In addition, the seventh negative electrode main body 31G disposed at the outermost periphery of the negative electrode body 30 is formed to be larger than the sixth negative electrode main body 31F disposed one step to the inner peripheral side of the seventh negative electrode main body 31G in the negative electrode connection direction in the dimension of the sum of the thickness of the negative electrode body 30, the thickness of the positive electrode body 40, and the thickness of two layers of the separators 50. Due to this, viewed from the laminating direction, the seventh negative electrode main body 31G is provided with a non-overlapping region R with which the sixth negative electrode main body 31F does not overlap. By arranging the fifth negative electrode connection portion 32E connected to the sixth negative electrode main body 31F and extending in the laminating direction and the sixth positive electrode connection portion 42F opposed to the fifth negative electrode connection portion 32E in the non-overlapping region R in a state of being viewed from the laminating direction, the fifth negative electrode connection portion 32E and the sixth positive electrode connection portion 42F do not protrude from the seventh negative electrode main body 31G viewed from the laminating direction. The same also applies to the relationship between the other negative electrode main body 31 and the other negative electrode connection portion 32.

As described above, since it is possible to limit the negative electrode connection portion 32 and the positive electrode connection portion 42 from protruding from the seventh negative electrode main body 31G when viewed from the laminating direction, it is possible to limit the laminated electrode body 2 from being deformed from the above basic shape viewed from the laminating direction. Accordingly, it is possible to wind the negative electrode body 30 and the positive electrode body 40 into a desired flat shape.

In addition, the Nth positive electrode connection portion 42 is formed such that the distance in the positive electrode connection direction between the major axes A2 of the Nth positive electrode main body 41 and the (N+1)th positive electrode main body 41 adjacent to the Nth positive electrode connection portion 42 matches the distance in the negative electrode connection direction between the major axes A1 of the Nth negative electrode main body 31 and the (N+1)th negative electrode main body 31 (also refer to FIG. 6). Due to this, it is possible to wind the plurality of positive electrode main bodies 41 from the innermost periphery toward the outer periphery to be disposed at the same pitch as the plurality of negative electrode main bodies 31. For this reason, viewed from the laminating direction, it is possible to overlap the major axis A2 of the plurality of positive electrode main bodies 41 with the major axis A1 of the negative electrode main body 31. As described above, since the plurality of negative electrode main bodies 31 are disposed in a state in which the positional deviation is limited, positional deviation in the plurality of positive electrode main bodies 41 is also limited. Moreover, since the positive electrode body 40 is disposed without slack between the layers of the negative electrode bodies 30, it is possible to limit the positive electrode connection portion 42 from protruding viewed from the laminating direction. Accordingly, it is possible to wind the negative electrode body 30 and the positive electrode body 40 into a desired flat shape.

In addition, the outer shape of each positive electrode main body 41 is smaller than the outer shape of the negative electrode main body 31 opposed thereto via the separator 50. Due to this, it is possible to avoid having the edge of the negative electrode body 30 present in the portion which the positive electrode main body 41 opposes. If the edge of the negative electrode body is present at the portion which opposes the positive electrode main body, there is a possibility that lithium ions transferred from the positive electrode body at the time of charging the battery may be concentrated on the edge of the negative electrode body by the edge effect and precipitated in a needle-like shape. As described above, when lithium ions are precipitated as lithium metal, there is a possibility that the lithium ions will pierce the separator and cause a short circuit between the negative electrode body and the positive electrode body. As in the present embodiment, by avoiding having the edge of the negative electrode body 30 present at the portion opposing the positive electrode main body 41, it is possible for the lithium ions to be absorbed in the negative electrode active material of the negative electrode body 30. Thus, it is possible to limit the precipitation of needle-like lithium from the negative electrode body 30. Accordingly, it is possible to improve the reliability of the battery 1.

As described above, in the present embodiment, the dimensions of the plurality of negative electrode connection portions 32 in the negative electrode connection direction increase with separation from the first negative electrode connection portion 32A disposed on the innermost periphery. Here, the interval in the winding state of the pair of negative electrode main bodies 31 adjacent to each other in the developed state becomes larger as the pair of negative electrode main bodies 31 is a pair of negative electrode main bodies 31 positioned further to the outer peripheral side. For this reason, since the dimension of the negative electrode connection portion 32 in the negative electrode connection direction increases with separation from the first negative electrode connection portion 32A, it is possible to secure the interval of the pair of negative electrode main bodies 31 and to limit positional deviation in each of the pairs of the negative electrode main bodies 31 in the wound state. Thus, viewed from the laminating direction, the positional deviation of the plurality of negative electrode main bodies 31 is limited.

In addition, the dimension of each negative electrode main body 31 in the negative electrode connection direction is smaller with separation from the seventh negative electrode main body 31G disposed at the outermost periphery. Due to this, the negative electrode main body 31 positioned on the outer peripheral side among the pair of negative electrode main bodies 31 adjacent to each other in the developed state is formed to be larger in the negative electrode connection direction than the negative electrode main body 31 positioned on the inner peripheral side. For this reason, in a state where the plurality of negative electrode main bodies 31 overlap each other, viewed from the laminating direction, a non-overlapping region in which the negative electrode main bodies 31 positioned on the inner peripheral side do not overlap is provided in the negative electrode main body 31 positioned on the outer peripheral side. Arranging the negative electrode connection portion 32, which is connected to the negative electrode main body 31 positioned on the inner peripheral side and which extends in the laminating direction, in the non-overlapping region of the negative electrode main body 31, which is positioned on the outer peripheral side viewed from the laminating direction, makes it possible to limit the negative electrode connection portion 32 from protruding from the negative electrode main body 31 positioned on the outer peripheral side viewed from the laminating direction.

As described above, viewed from the laminating direction, positional deviation of the plurality of negative electrode main bodies 31 and protrusion of the negative electrode connection portion 32 from the seventh negative electrode main body 31G of the outermost periphery are limited. Accordingly, it is possible to provide the battery 1 in which it is possible to wind the negative electrode body 30 into a desired flat shape and to improve the freedom of the shape and secure the capacity.

Second Embodiment

Figure 8:
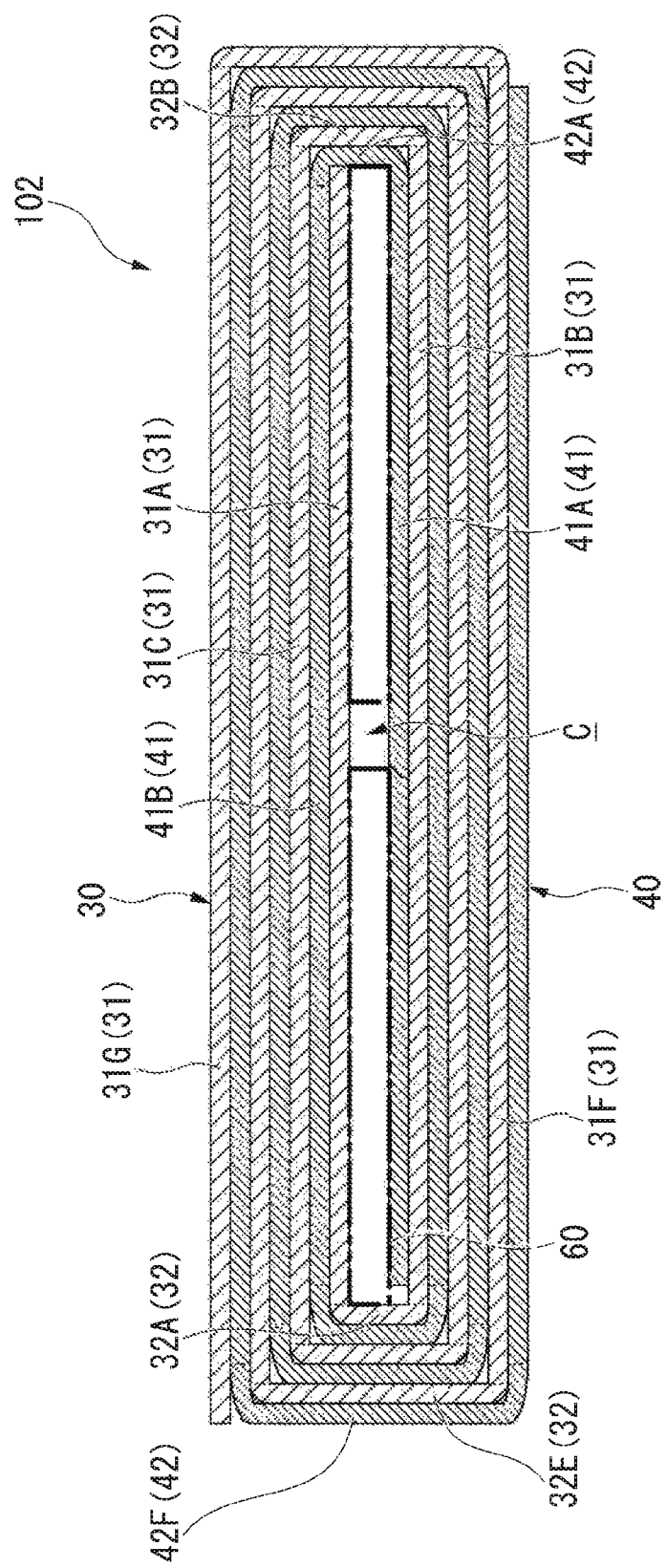
FIG. 8 is a cross-sectional view of a laminated electrode body of a second embodiment.

FIG. 8 is a cross-sectional view of a laminated electrode body of a second embodiment.

In the first embodiment shown in FIG. 3, the laminated electrode body 2 is densely wound around the winding center. In contrast, in the second embodiment shown in FIG. 8, a laminated electrode body 102 has a gap C at the winding center, which is the different point from the first embodiment. The configurations other than those described below are the same as those in the first embodiment.

As shown in FIG. 8, in the winding center of the laminated electrode body 102, a first negative electrode main body 31A and a first positive electrode main body 41A are arranged with an interval larger than the thickness of one layer of the separator 50 (see FIG. 4) in the laminating direction. As a result, the gap C is formed at the winding center of the laminated electrode body 102. The gap C is formed by pulling out a winding core 60, which will be descried later, from the laminated electrode body 102. Since one layer of the separator 50 (not shown) is disposed between the first negative electrode main body 31A and the first positive electrode main body 41A, the interval between the first negative electrode main body 31A and the first positive electrode main body 41A is equal to the sum of the thickness of the one layer of the separator 50 and the size of the gap C in the laminating direction.

The dimension of a first negative electrode connection portion 32A in a negative electrode connection direction is equal to or greater than the sum of the thickness of the positive electrode body 40, the thickness of two layers of the separators 50, and the size of the gap C in the laminating direction. That is, the dimension of the first negative electrode connection portion 32A in the negative electrode connection direction is equal to or greater than the thickness of the positive electrode body 40, the thickness of one layer of the separator 50, and the interval between the first negative electrode main body 31A and the first positive electrode main body 41A. In addition, among a plurality of negative electrode connection portions 32, the dimension of the negative electrode connection portions 32 other than the first negative electrode connection portion 32A is the same as that of the first embodiment.

The dimension of the gap C in the laminating direction is equal to or less than the thickness of the winding core 60, including a case where the laminated electrode body 102 is crushed. That is, the maximum value of the interval between the first negative electrode main body 31A and the first positive electrode main body 41A is equal to or less than the sum of the thickness of one layer of the separator 50 and the thickness of the winding core 60. For this reason, the maximum value of the dimension of the first negative electrode connection portion 32A in the negative electrode connection direction is equal to the thickness of the positive electrode body 40, the thickness of two layers of the separators 50, and the thickness of the winding core 60.

Figure 9:
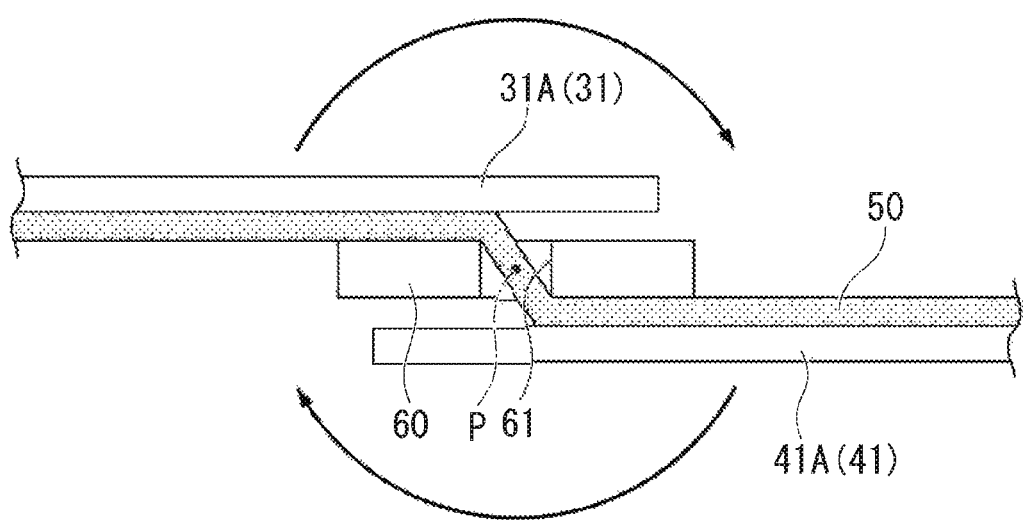
FIG. 9 is a view showing a winding method of a negative electrode body, a positive electrode body, and a separator of the second embodiment.

FIG. 9 is a schematic view showing a winding method of a negative electrode body, a positive electrode body, and a separator of the second embodiment.

As shown in FIG. 9, the laminated electrode body 102 is formed by winding the separator 50, the negative electrode body 30 and the positive electrode body 40 around the winding core 60. The winding core 60 is a flat plate-like member that extends with a certain width along a predetermined rotation axis P. The thickness of the winding core 60 is smaller than the width of the winding core 60. A slit 61 is formed in the winding core 60 along the rotation axis P. In the laminated electrode body 102, the first negative electrode main body 31A and the first positive electrode main body 41A are arranged such that the winding core 60 is sandwiched therebetween in a state where the strip-shaped separator 50 is entangled with the winding core 60 through the slit 61 of the winding core 60, thereby allowing the winding core 60 to be rotated. In this way, the negative electrode body 30 and the positive electrode body 40 are wound flatly in a state where they overlap with the separator 50 sandwiched therebetween. By pulling out the winding core 60 from the winding body, the laminated electrode body 102 having the gap C at the winding center is formed. The maximum value of the dimension of the gap C in the laminating direction matches the thickness of the winding core 60. Further, the dimension of the gap C in the direction orthogonal to the laminating direction matches the width of the winding core 60.

Next, the operation of the present embodiment will be described with reference to FIG. 8. Focus is given to the first negative electrode main body 31A and the second negative electrode main body 31B which are adjacent to each other in the developed state. The first positive electrode main body 41A and two layers of the separators 50 provided to sandwich the first positive electrode main body 41A are disposed between the first negative electrode main body 31A and the second negative electrode main body 31B. One layer of the separator 50 is disposed between the first negative electrode main body 31A and the first positive electrode main body 41A. For this reason, the interval between the first negative electrode main body 31A and the second negative electrode main body 31B is equal to the sum of the thickness of the positive electrode body 40, the thickness of one layer of the separator 50, and the interval between the first negative electrode main body 31A and the first positive electrode main body 41A. In the present embodiment, the interval between the first negative electrode main body 31A and the first positive electrode main body 41A is larger than the thickness of one layer of the separator 50, and the gap C is formed between the first negative electrode main body 31A and the first positive electrode main body 41A.

According to the present embodiment, the dimension of the first negative electrode main body 31A in the negative electrode connection direction is equal to or greater than the sum of the thickness of the positive electrode body 40, the thickness of one layer of the separator 50, and the interval between the first negative electrode main body 31A and the first positive electrode main body 41A. For this reason, even when the gap C is formed between the first negative electrode main body 31A and the first positive electrode main body 41A, the first negative electrode main body 31A and the second negative electrode main body 31B can be arranged such that they are in parallel to each other, and the boundary with the first negative electrode connection portion 32A in each of the first negative electrode main body 31A and the second negative electrode main body 31B can overlap each other when viewed from the laminating direction. In this way, the positional deviations of the first negative electrode main body 31A and the second negative electrode main body 31B are suppressed when viewed from the laminating direction.

As described above, positional deviations of a plurality of negative electrode main bodies 31 are suppressed.

Therefore, according to the present embodiment, the same operational effects as those in the first embodiment can be achieved. That is, when viewed from the laminating direction, the positional deviations of a plurality of negative electrode main bodies 31, and the negative electrode connection portion 32 protruding from the seventh negative electrode main body 31G of the outermost periphery are suppressed. Therefore, it is possible to provide a battery in which the negative electrode body 30 can be wound into a desired flat shape, the degree of freedom of the shape is improved and a capacity is secured.

The present invention is not limited to the embodiment described above with reference to the drawings and it is possible to consider various modifications within the technical scope thereof.

For example, in the embodiment described above, a secondary battery was described as an example of an electrochemical cell; however, without being limited thereto, the configuration described above may be applied to an electric double layer capacitor, a primary battery, and the like. In addition, although a description was provided of a lithium ion secondary battery as an example of a battery, without being limited thereto, secondary batteries other than lithium ion secondary batteries, such as a metal lithium secondary battery, may be used.

In a case where the configuration described above is applied to an electric double layer capacitor, the electric double layer capacitor is provided with a pair of electrodes having no distinction between positive and negative in function; however, one electrode may be formed in the same manner as the negative electrode body and the other electrode may be formed in the same manner as the positive electrode body.

In addition, in the embodiment described above, although the laminated electrode body 2 is formed in an oval shape viewed from the laminating direction, it is possible to form various shapes according to the shape of the exterior body without being limited thereto. For example, the laminated electrode body may be formed in a circular shape or an elliptical shape viewed from the laminating direction, or may be formed in a rectangular shape such as a rhombus or a rectangle.

In addition, in the embodiment described above, although the battery 1 is provided with the positive electrode terminal and negative electrode terminal exposed through the through hole of the exterior body 3, the present invention is not limited thereto. The battery may be provided with a tab-like terminal which extends from the inside of the exterior body to the outside between the first container and the second container in the sealing portion of the exterior body.

In addition, in the embodiment described above, although the negative electrode terminal is provided in the first container 10 and the positive electrode terminal is provided in the second container 20, the present invention is not limited thereto. That is, the positive electrode terminal may be provided in the first container and the negative electrode terminal may be provided in the second container.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An electrochemical cell comprising:
a negative electrode body wound to be flat,
wherein the negative electrode body has
a plurality of negative electrode main bodies arranged in a line in a first direction in a developed state, and
at least one negative electrode connection portion connecting a pair of negative electrode main bodies adjacent to each other in the developed state among the plurality of negative electrode main bodies,
the at least one negative electrode connection portion is folded back such that the plurality of negative electrode main bodies overlap each other,
among the plurality of negative electrode main bodies, the negative electrode main body disposed at an outermost periphery is defined as an outer end side negative electrode main body,
among the plurality of negative electrode main bodies, the negative electrode main body disposed at an innermost periphery is defined as inner end side negative electrode main body,
the at least one negative electrode connection portion is provided with an inner end side negative electrode connection portion, which is connected to the inner end side negative electrode main body,
a dimension of each of the plurality of negative electrode main bodies in the first direction decreases with separation from the outer end side negative electrode main body, and
a dimension of the at least one negative electrode connection portions in the first direction increases with separation from the inner end side negative electrode connection portion.

2. The electrochemical cell according to claim 1, further comprising:
a separator; and
a positive electrode body overlapping the negative electrode body via the separator.

3. The electrochemical cell according to claim 2,
wherein a sum of a thickness of the negative electrode body, a thickness of the positive electrode body, and a thickness of two layers of the separators is defined as a total dimension,
among the pair of negative electrode main bodies, a dimension in the first direction of a negative electrode main body positioned on an outer peripheral side is formed to be larger by the total dimension than a dimension in the first direction of a negative electrode main body positioned on an inner peripheral side.

4. The electrochemical cell according to claim 3,
wherein the at least one negative electrode connection portion includes a pair of negative electrode connection portions adjacent to each other in a developed state, and among the pair of negative electrode connection portions, a dimension in the first direction of a negative electrode connection portion positioned on an outer peripheral side is formed to be larger by the total dimension than a dimension in the first direction of a negative electrode connection portion positioned on an inner peripheral side.

5. The electrochemical cell according to claim 4,
wherein a dimension in the first direction of the inner end side negative electrode connection portion is equal to a sum of the thickness of the positive electrode body and the thickness of two layers of the separators.

6. The electrochemical cell according to claim 5,
wherein the plurality of negative electrode main bodies are formed in a shape having a major axis extending in a direction orthogonal to the first direction in the developed state,
the positive electrode body has
a plurality of positive electrode main bodies arranged in a line in a second direction in the developed state and formed in a shape having a major axis extending in a direction orthogonal to the second direction in the developed state, and
at least one positive electrode connection portion connecting a pair of positive electrode main bodies adjacent to each other in the developed state among the plurality of positive electrode main bodies,
the at least one positive electrode connection portion is folded back such that the plurality of positive electrode main bodies respectively overlap the plurality of negative electrode main body, and
in a case where
N is a natural number,
among the plurality of positive electrode main bodies, a positive electrode main body positioned Nth from a positive electrode main body disposed at the innermost periphery toward an outer peripheral side is defined as an Nth positive electrode main body, and
among the plurality of negative electrode main bodies, a negative electrode main body positioned Nth from the inner end side negative electrode main body toward an outer peripheral side is defined as an Nth negative electrode main body,
a positive electrode connection portion connecting the Nth positive electrode main body and an (N+1)th positive electrode main body among the at least one positive electrode connection portion is formed such that a distance between major axes of the Nth positive electrode main body and an (N+1)th positive electrode main body matches a distance between major axes of the Nth negative electrode main body and an (N+1)th negative electrode main body.

7. The electrochemical cell according to claim 4,
wherein the positive electrode body has a plurality of positive electrode main bodies arranged in a line in a second direction in the developed state,
the plurality of positive electrode main bodies are arranged to alternately overlap the plurality of negative electrode main bodies,
among the plurality of positive electrode main bodies, the positive electrode main body disposed at an innermost periphery is defined as an inner end side positive electrode main body,
the inner end side negative electrode main body and the inner end side positive electrode main body are arranged with an interval larger than a thickness of one layer of the separator, and a dimension of the inner end side negative electrode connection portion in the first direction is equal to or greater than a sum of the thickness of the positive electrode body, the thickness of one layer of the separator, and the interval between the inner end side negative electrode main body and the inner end side positive electrode main body.

8. The electrochemical cell according to claim 7,
wherein the plurality of negative electrode main bodies are formed in a shape having a major axis extending in a direction orthogonal to the first direction in the developed state,
the positive electrode body has at least one positive electrode connection portion connecting a pair of positive electrode main bodies adjacent to each other in the developed state among the plurality of positive electrode main bodies,
the plurality of positive electrode main bodies is formed in a shape having a major axis extending in a direction orthogonal to the second direction in the developed state,
the at least one positive electrode connection portion is folded back such that the plurality of positive electrode main bodies respectively overlap the plurality of negative electrode main body, and
in a case where
N is a natural number,
among the plurality of positive electrode main bodies, a positive electrode main body positioned Nth from a positive electrode main body disposed at the innermost periphery toward an outer peripheral side is defined as an Nth positive electrode main body, and
among the plurality of negative electrode main bodies, a negative electrode main body positioned Nth from the inner end side negative electrode main body toward an outer peripheral side is defined as an Nth negative electrode main body,
a positive electrode connection portion connecting the Nth positive electrode main body and an (N+1)th positive electrode main body among the at least one positive electrode connection portion is formed such that a distance between major axes of the Nth positive electrode main body and an (N+1)th positive electrode main body matches a distance between major axes of the Nth negative electrode main body and an (N+1)th negative electrode main body.

9. The electrochemical cell according to claim 4,
wherein the plurality of negative electrode main bodies are formed in a shape having a major axis extending in a direction orthogonal to the first direction in the developed state,
the positive electrode body has
a plurality of positive electrode main bodies arranged in a line in a second direction in the developed state and formed in a shape having a major axis extending in a direction orthogonal to the second direction in the developed state, and
at least one positive electrode connection portion connecting a pair of positive electrode main bodies adjacent to each other in the developed state among the plurality of positive electrode main bodies,
the at least one positive electrode connection portion is folded back such that the plurality of positive electrode main bodies respectively overlap the plurality of negative electrode main body, and
in a case where
N is a natural number,
among the plurality of positive electrode main bodies, a positive electrode main body positioned Nth from a positive electrode main body disposed at the innermost periphery toward an outer peripheral side is defined as an Nth positive electrode main body, and
among the plurality of negative electrode main bodies, a negative electrode main body positioned Nth from the inner end side negative electrode main body toward an outer peripheral side is defined as an Nth negative electrode main body,
a positive electrode connection portion connecting the Nth positive electrode main body and an (N+1)th positive electrode main body among the at least one positive electrode connection portion is formed such that a distance between major axes of the Nth positive electrode main body and an (N+1)th positive electrode main body matches a distance between major axes of the Nth negative electrode main body and an (N+1)th negative electrode main body.

10. The electrochemical cell according to claim 3,
wherein the plurality of negative electrode main bodies are formed in a shape having a major axis extending in a direction orthogonal to the first direction in the developed state,
the positive electrode body has
a plurality of positive electrode main bodies arranged in a line in a second direction in the developed state and formed in a shape having a major axis extending in a direction orthogonal to the second direction in the developed state, and
at least one positive electrode connection portion connecting a pair of positive electrode main bodies adjacent to each other in the developed state among the plurality of positive electrode main bodies,
the at least one positive electrode connection portion is folded back such that the plurality of positive electrode main bodies respectively overlap the plurality of negative electrode main body, and
in a case where
N is a natural number,
among the plurality of positive electrode main bodies, a positive electrode main body positioned Nth from a positive electrode main body disposed at the innermost periphery toward an outer peripheral side is defined as an Nth positive electrode main body, and
among the plurality of negative electrode main bodies, a negative electrode main body positioned Nth from the inner end side negative electrode main body toward an outer peripheral side is defined as an Nth negative electrode main body,
a positive electrode connection portion connecting the Nth positive electrode main body and an (N+1)th positive electrode main body among the at least one positive electrode connection portion is formed such that a distance between major axes of the Nth positive electrode main body and an (N+1)th positive electrode main body matches a distance between major axes of the Nth negative electrode main body and an (N+1)th negative electrode main body.

11. The electrochemical cell according to claim 2,
wherein the at least one negative electrode connection portion includes a pair of negative electrode connection portions adjacent to each other in a developed state,
a thickness of the negative electrode body, a thickness of the positive electrode body, and a thickness of two layers of the separators is defined as a total dimension, and among the pair of negative electrode connection portions,
a dimension in the first direction of a negative electrode connection portion positioned on an outer peripheral side is formed to be larger by the total dimension than a dimension in the first direction of a negative electrode connection portion positioned on an inner peripheral side.

12. The electrochemical cell according to claim 11,
wherein a dimension in the first direction of the inner end side negative electrode connection portion is equal to a sum of the thickness of the positive electrode body and the thickness of two layers of the separators.

13. The electrochemical cell according to claim 12,
wherein the plurality of negative electrode main bodies are formed in a shape having a major axis extending in a direction orthogonal to the first direction in the developed state,
the positive electrode body has
  a plurality of positive electrode main bodies arranged in a line in a second direction in the developed state and formed in a shape having a major axis extending in a direction orthogonal to the second direction in the developed state, and
  at least one positive electrode connection portion connecting a pair of positive electrode main bodies adjacent to each other in the developed state among the plurality of positive electrode main bodies,
the at least one positive electrode connection portion is folded back such that the plurality of positive electrode main bodies respectively overlap the plurality of negative electrode main body, and
in a case where
  N is a natural number,
    among the plurality of positive electrode main bodies, a positive electrode main body positioned Nth from a positive electrode main body disposed at the innermost periphery toward an outer peripheral side is defined as an Nth positive electrode main body, and
    among the plurality of negative electrode main bodies, a negative electrode main body positioned Nth from the inner end side negative electrode main body toward an outer peripheral side is defined as an Nth negative electrode main body,
a positive electrode connection portion connecting the Nth positive electrode main body and an (N+1)th positive electrode main body among the at least one positive electrode connection portion is formed such that a distance between major axes of the Nth positive electrode main body and an (N+1)th positive electrode main body matches a distance between major axes of the Nth negative electrode main body and an (N+1)th negative electrode main body.

14. The electrochemical cell according to claim 11,
wherein the positive electrode body has a plurality of positive electrode main bodies arranged in a line in a second direction in the developed state,
the plurality of positive electrode main bodies are arranged to alternately overlap the plurality of negative electrode main bodies,
among the plurality of positive electrode main bodies, the positive electrode main body disposed at an innermost periphery is defined as an inner end side positive electrode main body,
the inner end side negative electrode main body and the inner end side positive electrode main body are arranged with an interval larger than a thickness of one layer of the separator, and a dimension of the inner end side negative electrode connection portion in the first direction is equal to or greater than a sum of the thickness of the positive electrode body, the thickness of one layer of the separator, and the interval between the inner end side negative electrode main body and the inner end side positive electrode main body.

15. The electrochemical cell according to claim 14,
wherein the plurality of negative electrode main bodies are formed in a shape having a major axis extending in a direction orthogonal to the first direction in the developed state,
the positive electrode body has at least one positive electrode connection portion connecting a pair of positive electrode main bodies adjacent to each other in the developed state among the plurality of positive electrode main bodies,
the plurality of positive electrode main bodies is formed in a shape having a major axis extending in a direction orthogonal to the second direction in the developed state,
the at least one positive electrode connection portion is folded back such that the plurality of positive electrode main bodies respectively overlap the plurality of negative electrode main body, and
in a case where
  N is a natural number,
    among the plurality of positive electrode main bodies, a positive electrode main body positioned Nth from a positive electrode main body disposed at the innermost periphery toward an outer peripheral side is defined as an Nth positive electrode main body, and
    among the plurality of negative electrode main bodies, a negative electrode main body positioned Nth from the inner end side negative electrode main body toward an outer peripheral side is defined as an Nth negative electrode main body,
a positive electrode connection portion connecting the Nth positive electrode main body and an (N+1)th positive electrode main body among the at least one positive electrode connection portion is formed such that a distance between major axes of the Nth positive electrode main body and an (N+1)th positive electrode main body matches a distance between major axes of the Nth negative electrode main body and an (N+1)th negative electrode main body.

16. The electrochemical cell according to claim 11,
wherein the plurality of negative electrode main bodies are formed in a shape having a major axis extending in a direction orthogonal to the first direction in the developed state,
the positive electrode body has
  a plurality of positive electrode main bodies arranged in a line in a second direction in the developed state and formed in a shape having a major axis extending in a direction orthogonal to the second direction in the developed state, and
  at least one positive electrode connection portion connecting a pair of positive electrode main bodies adjacent to each other in the developed state among the plurality of positive electrode main bodies,
the at least one positive electrode connection portion is folded back such that the plurality of positive electrode main bodies respectively overlap the plurality of negative electrode main body, and
in a case where
  N is a natural number, among the plurality of positive electrode main bodies, a positive electrode main body positioned Nth from a positive electrode main body disposed at the innermost periphery toward an outer peripheral side is defined as an Nth positive electrode main body, and
among the plurality of negative electrode main bodies, a negative electrode main body positioned Nth from the inner end side negative electrode main body toward an outer peripheral side is defined as an Nth negative electrode main body,
a positive electrode connection portion connecting the Nth positive electrode main body and an (N+1)th positive electrode main body among the at least one positive electrode connection portion is formed such that a distance between major axes of the Nth positive electrode main body and an (N+1)th positive electrode main body matches a distance between major axes of the Nth negative electrode main body and an (N+1)th negative electrode main body.

17. The electrochemical cell according to claim 2,
wherein the plurality of negative electrode main bodies are formed in a shape having a major axis extending in a direction orthogonal to the first direction in the developed state,
the positive electrode body has
a plurality of positive electrode main bodies arranged in a line in a second direction in the developed state and formed in a shape having a major axis extending in a direction orthogonal to the second direction in the developed state, and
at least one positive electrode connection portion connecting a pair of positive electrode main bodies adjacent to each other in the developed state among the plurality of positive electrode main bodies,
the at least one positive electrode connection portion is folded back such that the plurality of positive electrode main bodies respectively overlap the plurality of negative electrode main body, and
in a case where
N is a natural number,
among the plurality of positive electrode main bodies, a positive electrode main body positioned Nth from a positive electrode main body disposed at the innermost periphery toward an outer peripheral side is defined as an Nth positive electrode main body, and
among the plurality of negative electrode main bodies, a negative electrode main body positioned Nth from the inner end side negative electrode main body toward an outer peripheral side is defined as an Nth negative electrode main body,
a positive electrode connection portion connecting the Nth positive electrode main body and an (N+1)th positive electrode main body among the at least one positive electrode connection portion is formed such that a distance between major axes of the Nth positive electrode main body and an (N+1)th positive electrode main body matches a distance between major axes of the Nth negative electrode main body and an (N+1)th negative electrode main body.

18. The electrochemical cell according to claim 17,
wherein an outer shape of each of the plurality of positive electrode main bodies is smaller than an outer shape of a negative electrode main body included in the plurality of negative electrode main bodies which is opposed to each of the plurality of positive electrode main bodies via the separator.

19. The electrochemical cell according to claim 18,
wherein the positive electrode body includes a lithium compound as a positive electrode active material.

* * * * *